3,014,130
RADIOLOGY APPARATUS, IN PARTICULAR FOR PULMONARY STATIDENSIOGRAPHY

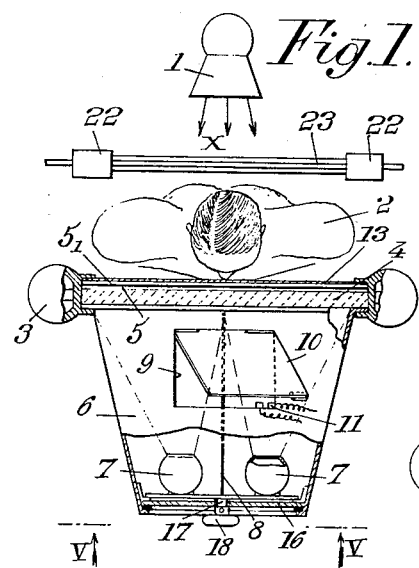
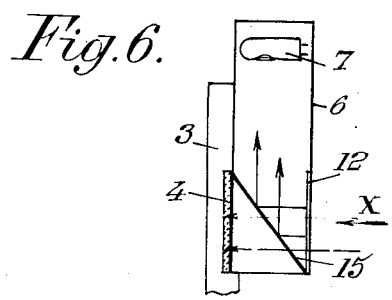
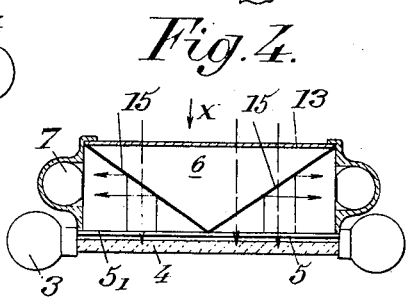
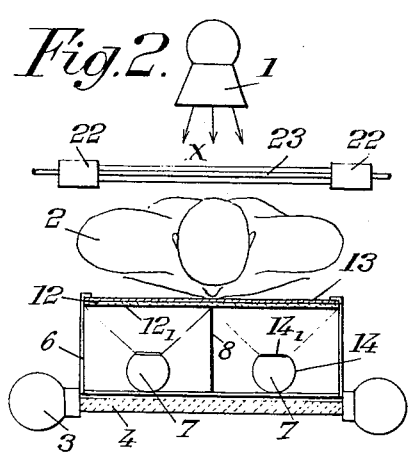
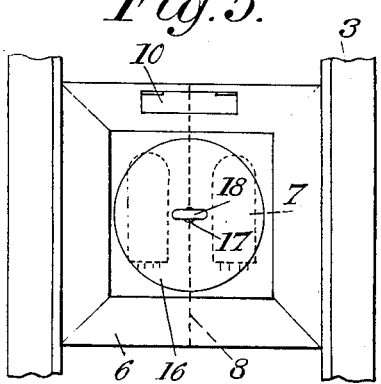
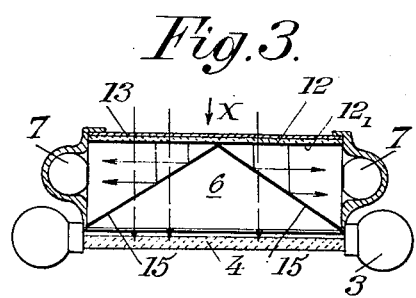

Henri Maurice Marchal and Marie Thérèse Marchal, nee Dupuy, both of 12 Rue Jacques Bingen, Paris, France
Filed Apr. 28, 1959, Ser. No. 809,450
Claims priority, application France Apr. 30, 1958
4 Claims. (Cl. 250—71.5)

The invention relates to apparatus used in radiology, especially in densiography. In accordance with this technique, variations of opacity and therefore "density" of at least one organ are recorded by causing a beam of rays, X-rays or other beams to pass through this organ, and receiving this beam on a radioscopic screen after it has passed through said organ, that is to say, presenting to such rays a visible fluorescence or luminescence, by subjecting a device such as a photo-multiplier to the luminous rays thus generated, said device being capable of supplying an electric current having an intensity proportional to the luminous intensity which it receives, and by recording the variations of this electrical intensity after having suitably amplified and filtered said intensity. Since it is in the cases mentioned that its application seems to offer the greatest advantage the invention is more particularly, though not exclusively concerned with those devices which are utilized in pulmonary "statidensiograhy," in which the overall luminous intensities respectively corresponding to each lung—or to two distinct portions of the lung—of the patient being examined are separately and simultaneously recorded by means of two distinct photo-multipliers.

The invention has for its particular object to produce apparatus which complies more effectively with conditions required in practice than any other apparatus up to the present time, particularly insofar as they enable the irradiated organs to be easily observed at the same time as their variations of transparency are recorded.

According to the present invention, a densiography apparatus for recording the variations of opacity of at least one organ comprises a source adapted to emit a radiation flux, means for directing said radiation to pass through said organ, a radioscopic screen for receiving said radiation after its passage through said organ, at least one device capable of delivering an electric current having a varying intensity proportional to the variations of intensity of the luminous flux directed on said device from at least one part of said screen, means for amplifying and filtering said current variations, and means for recording the amplified and filtered current variations, thereby enabling direct radioscopic observation of the irradiated organ to be readily effected.

Apart from these main characteristics, the invention comprises certain other arrangements which are preferably used at the same time, (but which could, if necessary, be used independently) and which will be referred to in more detail below, in particular; a second device—more especially relating to apparatus for pulmonary statidensiography comprising two devices (such as photo-multipliers) which are capable of supplying electric currents, the intensities of which are respectively proportional to the intensities of the X-ray fluxes which have respectively passed through each lung of a patient—consisting in mounting these two devices in such manner that they may easily be interchanged particularly by fixing them on a common support adapted to be fixed in two distinct positions about a shaft and displaced with respect to each other by an angle of 180°.

The invention is more particularly directed to a certain method of application (that which is applied to pulmonary statidensiography) in addition to certain methods of construction of said arrangements; and it is again more particularly directed, by way of to new industrial products, to apparatus of the type in question comprising the application of these same arrangements in addition to the parts and special tools designed for their installation and the assembled units, especially radiological installations, which are equipped with similar apparatus.

The invention may in any case be easily understood with the assistance of the descriptive text which follows below, in addition to the accompanying drawings, it being understood that both the description and drawings are only given by way of indication and without implied limitation.

FIG. 1 of the drawings shows diagrammatically in plan part of an installation for pulmonary statidensiography assembled in accordance with the invention.

FIGS. 2, 3 and 4 similarly show a partial view of three alternative forms of installations for pulmonary statidensiography assembled in accordance with the invention FIG. 5 is a vertical view along the line V—V of FIG. 1 of the installation which is partially shown diagrammatically in FIG. 1.

Finally FIG. 6 shows diagrammatically in vertical cross-section a further alternative form of installation assembled in accordance with the invention.

In accordance with the invention and more especially with that of its methods of application, and also in accordance with these methods of construction of its various parts to which it appears necessary to give preference, proposing for example to record separately and simultaneously the overall variations of opacity and therefore of density of each of the two lungs of a patient and of at least one portion of one of his lungs, the following or a similar procedure will be adopted.

It should first be recalled that the variations of this kind are substantially proportional to the ventilation of the corresponding lungs: the pulmonary statidensiography thus enables the breathing of a patient to be studied, whether normal or forced, and in particular the share which is taken by each of the two lungs in the total ventilation, in addition to the individual actions of these two lungs.

A source of X-rays 1 (FIG. 1) is used to irradiate the patient 2, for example his back, and on the path of the X-ray beyond the patient there is arranged a frame 3 supporting in adjustable manner a radioscopic screen 4 constituted for example by a thick lead glass (transparent to light but opaque with respect to X-rays in order to protect the observer) covered by a sheet 5 of plastic material coated with a substance such as calcium tungstate or zinc sulphide which produce a visible fluorescence under the impact of the X-rays (sheet 5 generally covered externally by a protective sheet $5_1$ of plastic material which is opaque to light but transparent to X-rays).

On the surface of this screen facing the patient there is mounted a casing 6 which is opaque to light and preferably having the shape of a truncated pyramid, the large base of which is formed by the screen 4.

According to whether it is desired to study the two lungs of the patient 2 simultaneously or separately, there is arranged within the interior of the container 6: either a single photo-multiplier cell which is sensitive to the overall illumination of the radioscopic screen (which for example enables the complete breathing of the patient to be studied); or two photo-multiplier cells 7 (FIG. 1) arranged in such manner that each cell receives the luminous flux diffused by only one of the two right and left halves of the radioscopic screen (which especially permits of the selective examination of the ventilation of each lung of the patient), an opaque vertical partition 8 being arranged for this purpose in the casing 6 parallel to the general direction of the flux of X-rays, so as to divide this casing into two half-casings each containing one of the two cells.

In order that the illumination received by the cells should be substantially proportional to the transparencies of the organs through which the rays pass, it is necessary to limit the luminous flux diffused by the radioscopic screen to its portions which effectively correspond to the said organs.

The areas of the screen which do not correspond to the useful flux are usually covered with paper before mounting the casing 6.

But when the casing is mounted, direct radioscopic observation is no longer possible: it is thus hardly possible to check whether the patient has remained in the correct position during the densiographic recording.

In order to overcome this drawback, the apparatus is so arranged, in accordance with the invention, that the observation of the organs of the patient is possible during the said recording or immediately before and afterwards.

In accordance with a first alternative form, there is provided in the casing 6 a window 9 which it is possible to close with a shutter 10, the whole unit being arranged in such manner that the opening of this shutter opens a microcontact 11 mounted in the voltage supply circuit of the cells; in this manner the cells, which are sensitive to the light diffused by the screen 4, are made automatically insensitive to the bright light which is able to pass through the window 9 when the shutter 10 is opened.

It is therefore only necessary to open this shutter 10 in order to observe the organs of the patient on the screen 4.

In accordance with a further alternative form permitting of the observation of said organs at the same time as the densiographic recording, a casing 6 is employed which is opaque to light and containing for example two cells 7 separated by a vertical partition 8 (FIG. 2) but this casing is arranged between the patient 2 and the normal radioscopic screen 4 while its rear wall which is directed towards the patient is formed by a second radioscopic screen 12 (constituted by a sheet of plastic material coated on the interior of the container with a layer $12_1$ of a fluorescent substance); the illumination from this screen excites the cells, the screen being sufficiently transparent to X-rays so that these latter may subsequently activate the screen 4 which may be directly observed in continuous manner.

In a system of this kind, the X-rays successively pass through the patient 2, and subsequently through a protective plate 13, the auxiliary screen 12, the interior of the casing 6 and the main screen 4.

In order to protect the cells 7 from the X-rays, they are encased with lead sheets 14 perforated with orifices which are closed by means of lead glass windows $14_1$ which are transparent to the light of the screen but opaque to X-rays.

These sheets form on the screen 4 large shadows which may hinder the visual observation of the screen 4.

In order to overcome this disadvantage and in accordance with a further alternative form, the cells 7 (FIG. 3) are arranged out of the X-ray flux and the light diffused by the auxiliary screen 12 is reflected towards the cells by means of mirrors 15 (plane or otherwise) which are transparent to X-rays and constituted for example by a plastic material or a glass coated with aluminium or silver.

The luminous rays therefore follow elbowed paths which are similar to those shown in full lines on FIG. 3 so as to irradiate the lateral cells whereas the X-rays are propagated in the direction of the straight arrows shown in dotted lines, in such manner as to impregnate the main radioscopic screen 4 on which there is then formed an image without any troublesome shadow.

In this alternative form the lead glass windows $14_1$ of the cells are no longer necessary, which is an interesting advantage of this arrangement. The partition 8 is also superfluous in this alternative form.

In accordance with a further alternative form shown in FIG. 4, the sheet $5_1$ which protects the fluorescent film formed on the sheet 5 glued to the lead glass window 4 is constituted by a substance which is transparent to X-rays and to light, and the mirrors 15 are so directed as to reflect the light diffused by the said film towards the cells, this film being capable of being observed at the same time directly through the lead glass window.

In order to transmit the light of the screen 12 to the cells 7, it would of course be possible to employ light-guides in the place of mirrors, by using for example at least one mass of plastic material or the like, suitably shaped, transparent to X-rays and designed for the integral transmission of the light received at one extremity to the other extremity.

It is rare that two distinct photo-multiplier cells available in commerce have the same sensitivity.

In order to make a judicious comparison between the ventilations of the two lungs or portions of lungs detected separately by means of two cells of this kind, it is an advantage to arrange the installation in such manner that these two cells may be interchanged by a simple operation.

An arrangement of this kind has been shown in FIGS. 1 and 5, in accordance with which the two cells respectively installed in the two left and right half-casings are mounted on a common disc 16 forming the bottom of the casing and adapted to pivot about a shaft 17 under the control of a knob 18. This disc may therefore be immobilized in two positions of operation displaced at an angle of 180° with respect to each other, each cell thus being employed alternately for detecting the ventilation of the two lungs of the patient.

Similar means may be provided for all the alternative forms described above.

For example instead of being arranged laterally, the two cells may be placed above or beneath the casing 6 and mounted on a common support pivoted about a vertical axis, while the mirrors 16 may then be replaced by a single plane mirror which is inclined to the horizontal plane and the reflected lighting of which would be divided by means of an opaque vertical central wall.

In a general manner, the mounting of the cells 7 above or beneath the casing 6 (FIG. 6) enables the cells to be moved away from the screen which irradiates said cells to a greater extent and with greater facility than it would be possible to obtain by mounting the cells on the lateral uprights of the radiological apparatus; it is an advantage to provide a distance apart in this manner since it ensures that the light to be employed is distributed over the cell in a more homogeneous manner, thus making the measurement more closely dependent on the overall illumination of the screen and less sensitive to local variations of its luminosity.

In this alternative form it may be an advantage to replace the cells by photographic devices enabling the image on the screen to be directly recorded.

In consequence of the foregoing, and irrespective of the method of construction adopted, the apparatus finally produced has a number of advantages as compared with those which exist up to the present time, particularly as concerns the following features: the possibility of direct radioscopic examination of the irradiated organs during the recording of the variations of transparency of these organs; the value of the comparative data obtained with respect to the simultaneous transparency of two different organs.

It will of course be understood, and this also results from the foregoing description, that the invention is not in any way limited to any of the methods of application or of the methods of construction of its various parts which have been more particularly considered; and on the contrary it comprises all alternative forms.

What we claim is:

1. A densigraphy apparatus to permit recording the variations of opacity of an object which comprises, in combination, a source of penetrating rays for projecting a beam of such rays through said object, a screen perpendicular to the direction of said beam located on the other side of said object from said source, said screen comprising a layer of ray sensitive material adapted to emit light when exposed to the action of said rays, at least one photosensitive element for constantly measuring the intensity of a light flux impinging thereon, said light sensitive element being located on the outside of the space occupied by the beam of said rays emitted from said source onto said screen, mirror means opaque to light but transparent to said penetrating rays, said mirror means being located in said space and having reflective surfaces oblique to the direction of said beam to reflect onto said light sensitive element the light rays emitted from said screen in response to the action of said penetrating rays impinging thereon, and means on the other side of said screen from said source and said object for fluoroscopic observation of said object.

2. An apparatus according to claim 1 in which said mirror means are located on the other side of said screen from said source and said fluoroscopic observation means include another fluorescent screen parallel to the first one located on the other side of said mirror means from said first mentioned screen and a plate of a material opaque to said penetrating rays but transparent to light, said plate being located on the other side of said second mentioned screen from said mirror means.

3. An apparatus according to claim 1 in which said mirror means are located on the same side of said screen as said source and said fluoroscopic observation means include a plate of a material opaque to said penetrating rays but transparent to light, said plate being located on the other side of said screen from said mirror means and being parallel to said screen.

4. A densigraphy apparatus to permit recording the variations of opacity of the lungs of a patient which comprises, in combination, a source of penetrating rays for projecting a beam of such rays through said lungs, a screen perpendicular to the direction of said beam located on the other side of said object from said source, said screen comprising a layer of ray sensitive material adapted to emit light when exposed to the action of said rays, two photosensitive elements for constantly measuring the intensity of light fluxes impinging thereon, said light sensitive element being located on the outside of the space occupied by the beam of said rays emitted from said source onto said screen and on the right and on the left of said space respectively, two mirrors opaque to light but transparent to said penetrating rays, said mirrors being located in said space and located in two vertical planes oblique with respect to the direction of said beam and symmetrical with respect to a vertical plane dividing said screen into two equal portions, so as to reflect onto each of said light sensitive element the light rays emitted from the corresponding portion of said screen in response to the action of said penetrating rays impinging thereon, and means on the other side of said screen from said source and said object for fluoroscopic observation of said object.

References Cited in the file of this patent
UNITED STATES PATENTS

| | | |
|---|---|---|
| 2,486,866 | Morgan et al. | Nov. 1, 1949 |
| 2,840,716 | Godbarsen | June 24, 1958 |